United States Patent
DePietro

(10) Patent No.: US 9,752,296 B2
(45) Date of Patent: Sep. 5, 2017

(54) ALIGNMENT TOOL FOR A MANWAY COVER

(71) Applicant: Universal Hinge Corporation, Manchester, NH (US)

(72) Inventor: Edward A. DePietro, Manchester, NH (US)

(73) Assignee: Universal Hinge Corporation, Manchester, NH (US)

( * ) Notice: Subject to any disclaimer, the term of this patent is extended or adjusted under 35 U.S.C. 154(b) by 525 days.

(21) Appl. No.: 14/220,793

(22) Filed: Mar. 20, 2014

(65) Prior Publication Data

US 2014/0283359 A1 Sep. 25, 2014

Related U.S. Application Data

(60) Provisional application No. 61/804,324, filed on Mar. 22, 2013.

(51) Int. Cl.
| | |
|---|---|
| *E02D 29/12* | (2006.01) |
| *E02D 29/14* | (2006.01) |
| *B25B 27/16* | (2006.01) |
| *F16L 55/10* | (2006.01) |

(52) U.S. Cl.
CPC .......... *E02D 29/1445* (2013.01); *B25B 27/16* (2013.01); *E02D 29/12* (2013.01); *F16L 55/10* (2013.01); *Y10T 29/49899* (2015.01); *Y10T 29/53913* (2015.01)

(58) Field of Classification Search
CPC ...... E02D 29/1445; E02D 29/12; F16L 55/10; B25B 27/16; Y10T 29/53913; Y10T 29/49899; E05Y 2900/612; E01C 2201/065; B66D 3/16; B66C 23/203
See application file for complete search history.

(56) References Cited

U.S. PATENT DOCUMENTS

| | | | | |
|---|---|---|---|---|
| 2,393,795 | A * | 1/1946 | Miller | ..................... B25B 27/16 254/100 |
| 7,556,160 | B2 * | 7/2009 | Porebski | ............... B66C 23/203 212/179 |
| 7,703,215 | B1 * | 4/2010 | Sanchez | .................. B25B 27/16 33/520 |

(Continued)

OTHER PUBLICATIONS

PCT International Search Report, PCT/US2014/031389, Korean Intellectual Property Office, Mailed Jul. 30, 2014.

*Primary Examiner* — Jacob Cigna
*Assistant Examiner* — Lee A Holly
(74) *Attorney, Agent, or Firm* — Robert R. Deleault, Esq.; Mesmer & Deleault, PLLC

(57) ABSTRACT

An alignment tool for use in aligning a manway cover with a manway body/flange includes an alignment tool plate having a plate body, a first planar surface and a plurality of plate openings each spaced from a first edge where each of the plurality of plate openings are positioned to align with a corresponding opening in the manway body/flange, a tool beam support having a distal end portion and extending a predefined distance transversely from the tool alignment plate, a cover attachment plate having at least one through-opening sized and positioned for attachment of the cover attachment plate to the manway cover, and a height adjuster extending between and connecting the tool beam support to the cover attachment plate.

6 Claims, 5 Drawing Sheets

(56) References Cited

U.S. PATENT DOCUMENTS

| | | | |
|---|---|---|---|
| 8,038,031 B2 * | 10/2011 | DePietro | B65D 90/10 16/382 |
| 2005/0242051 A1 | 11/2005 | Porebski et al. | |
| 2006/0219649 A1 * | 10/2006 | Wolfford, Sr. | B66D 3/16 212/166 |
| 2008/0078127 A1 | 4/2008 | Hill et al. | |
| 2010/0230553 A1 | 9/2010 | Wolfford, Sr. | |
| 2012/0285975 A1 | 11/2012 | DePietro et al. | |

\* cited by examiner

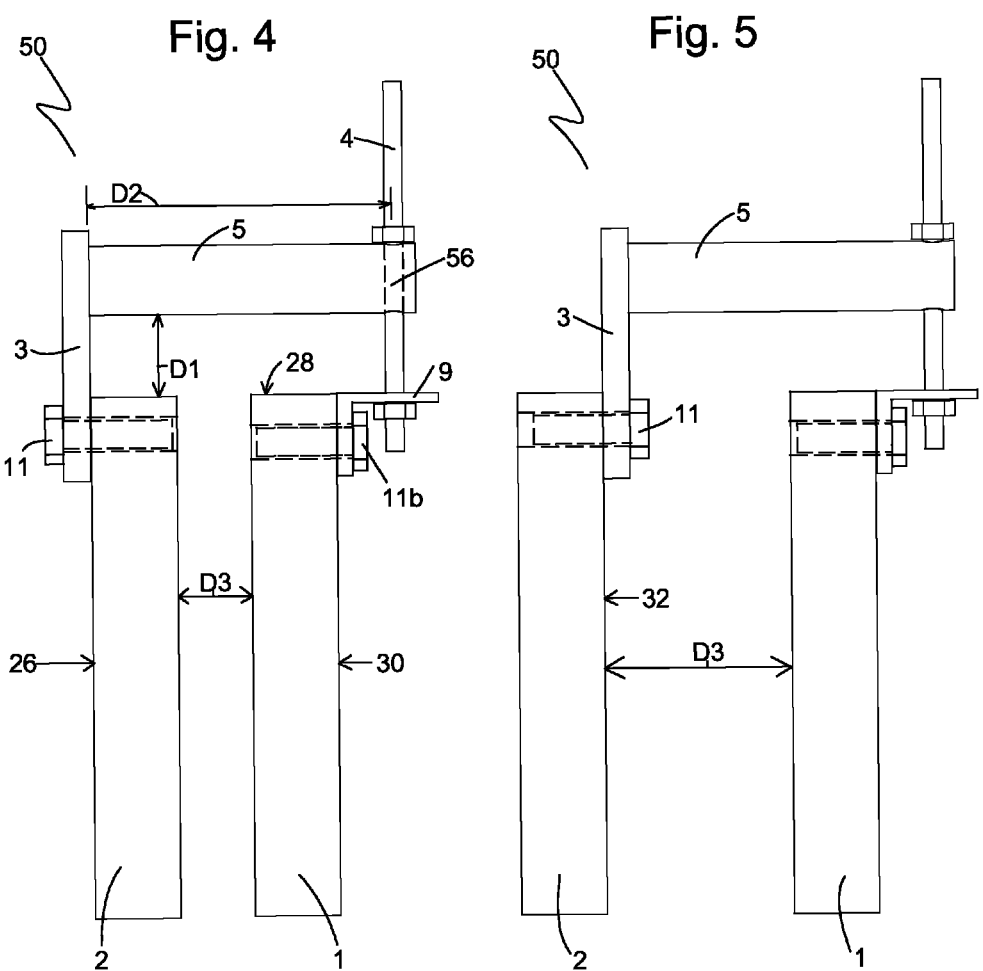

1

ALIGNMENT TOOL FOR A MANWAY COVER

BACKGROUND OF THE INVENTION

1. Field of the Invention

The present invention relates generally to "manway" covers for access to enclosed spaces such as tanks, conduits, storage areas, heat exchanger tubes. Particularly, the present invention relates to mechanisms to assist in the removal of "manway" covers. More particularly, the present invention relates to mechanisms for handling the removal and installation of "manway" covers that are too heavy to be handled by an unaided individual.

2. Description of the Prior Art

Manway covers are typically large, heavy, metal plates that are bolted to an opening. For purposes of the present invention, the definition of "manway covers" expressly means any heavy covers or closures having a weight of thirty-five (35) pounds or more used on pressure vessels, vacuum vessels, atmospheric vessels, heat exchangers, heat exchanger channel covers, heat exchanger channels, heat exchanger bonnets, or any type of blanking plate and is not construed to be limited to only covers used on openings that are dimensionally-sized to allow passage of a man. The most common are circularly-shaped and mate to a flange by way of a plurality of bolts evenly spaced around the periphery of the opening. However, it should be understood that the heavy covers may be any shape. The defined manway covers typically provide access to enclosed spaces such as tanks, conduits, storage areas, transfer tubes, pressure vessels, vacuum vessels, atmospheric vessels, heat exchangers, heat exchanger channel covers, heat exchanger channels, heat exchanger bonnets, and the like.

Routine servicing and inspection requirements as well as other operating conditions necessitate periodic removal of these manway covers. In view of the typical location and weight of the manway covers, it is not a simple task to remove the cover or to re-install the same. Removal is currently accomplished with the use of hand operated davit swing arms, chain falls, ratchet hoists, portable hinge devices, and brute force. Except for davit swing arms and portable hinge devices, it is necessary during the removal process to lower the covers a distance to a level surface.

SUMMARY OF THE INVENTION

The present invention provides an alignment tool device for a manway cover. An alignment tool for use in aligning a manway cover with a manway body/flange. In one embodiment, the alignment tool includes an alignment tool plate, a tool beam support, a cover attachment plate, and a height adjuster. The alignment tool plate includes a plate body having a first planar surface and a plurality of plate openings each spaced from the first edge, where each plate opening is positioned to align with a corresponding opening in the manway body/flange. The tool beam support has a distal end portion and extends a predefined distance transversely from the tool alignment plate. The cover attachment plate has at least one through-opening sized and positioned for attachment of the cover attachment plate to the manway cover. The height adjuster extends between and connects the tool beam support to the cover attachment plate.

In another embodiment, the cover attachment plate has a first plate portion and a second plate portion extending transversely from the first plate portion to define an L-shape. The first plate portion is capable of a removable connection to the height adjuster and the second plate portion includes the through-opening(s) for attachment to the manway cover.

In another embodiment, the height adjuster is moveable along a predefined length of the tool beam support.

In another embodiment, the tool beam support includes one of a track for longitudinal movement of the height adjuster relative to the tool beam support and a slot through the tool beam support. In one embodiment, the track is on an outside surface of the tool beam support. In another embodiment, the track is on an inside surface of the tool beam support.

In another embodiment, at least one of the plate openings is an elongated slot.

In another embodiment, the tool beam support extends substantially perpendicularly from the first planar surface of the tool alignment plate.

In another embodiment, the height adjuster includes a threaded rod. In one embodiment, the tool beam support defines a threaded through-opening in the distal end portion for threaded engagement with the threaded rod. In another embodiment, the height adjuster further comprises a handle attached to a proximal end of the height adjuster, where the handle adapted to threadably advance the tool adjuster through the threaded through-opening in the distal end portion of the tool beam support.

In another embodiment, the height adjuster is positioned along the tool beam support a predefined distance from the tool alignment plate.

In another embodiment, a horizontal distance between the cover attachment plate and the alignment tool plate is adjustable. The horizontal distance may be adjusted, for example, by moving the height adjuster along the tool beam support.

In another embodiment, the alignment tool also includes a set-screw flange extending transversely from the tool alignment plate and defining a set-screw opening extending through the set-screw flange. A set screw is adapted to extend through and threadably engage the set-screw opening.

The alignment tool device is used for aligning the holes/openings in the manway cover with the corresponding holes/openings in the manway body or manway flange when re-attaching a manway cover that was previously removed. Typically, when portable hinges or even fixed hinges are used to support the manway cover after removal from the manway body/flange, the weight of the manway cover often causes the hinge to deflect too much such that the fastener openings in the cover and the corresponding fastener openings in the manway body/flange no longer align. If the corresponding fastener openings no longer align, then the fasteners that are inserted through the cover openings cannot be inserted into the body/flange openings and the cover cannot be re-attached to the body/flange without great effort, which can place workers in danger due to the weight of the cover. The alignment tool of the present invention solves this problem. This is best explained by describing how the present invention is used.

The alignment tool plate is secured to either a manway body or mating flange to which a manway cover is attached or attachable. The plate opening is used to secure the alignment tool plate to the manway body or mating flange. Even though a single plate opening is sufficient, the use of two plate openings to secure the alignment tool plate to two corresponding openings in the manway body or mating flange reduces the likelihood of pivoting movement of the alignment tool plate relative to the manway body or mating flange once attached. One of the plate openings may be an elongated slot to further facilitate alignment of the openings in the alignment tool plate with the corresponding openings in the manway body or mating flange. Fasteners or pins secure the tool plate to the manway body/flange. The cover attachment plate is attached to the manway cover also using a fastener or pin. When the tool plate is attached to the manway body/flange, the tool beam support extends across and a predefined distance from the outside, circumferential edge of the manway cover and the cover attachment plate. The height adjuster is inserted through the tool beam support at a through opening in the beam designated for the height adjuster. The height adjuster extends towards and connects to the cover attachment plate so that the height adjuster is securely attached to the cover attachment plate. When a threaded rod is used as the height adjuster, a height-adjusting nut is threadably attached to the threaded rod and contacts the tool beam support or a spacer disposed between the tool beam support and the height-adjusting nut on a side of the tool beam support opposite the side of the cover attachment plate.

To align the cover fastener openings with the manway body/flange openings, the height-adjusting nut is rotated clockwise or counterclockwise, whatever the case may be, to raise or lower the manway cover relative to the tool beam support. Once aligned, the standard cover fasteners that were removed to separate the cover from the manway body/flange are installed and the cover is then secured. It is contemplated that the alignment tool plate may be permanently attached to the manway body/flange if desired by means of fasteners or welding.

Another aspect of the present invention relates to a method of aligning a manway cover to a manway body/flange. In one embodiment, the method includes providing a tool alignment device that includes a tool alignment plate having a plurality of plate openings each spaced from a first edge of a plate body and a tool beam support extending transversely from the tool alignment plate, a cover attachment plate having at least one cover plate opening sized and positioned to align with a corresponding manway cover opening in the manway cover, and a height adjuster extending between and connecting the tool beam support to the cover attachment plate where a distance between the tool beam support and the cover attachment plate is adjustable using the height adjuster. The method also includes attaching the tool alignment plate to the manway body/flange, attaching the cover attachment plate to the manway cover, and adjusting the position of the height adjuster to raise or lower the cover attachment plate, thereby adjusting the vertical position of the manway cover openings for alignment with the corresponding manway body or mating flange openings.

In another embodiment, the method also includes the steps of inserting the height adjuster through a distal end portion of the beam support with a distal end of the height adjuster extending through an opening through the cover attachment plate and with a proximal end of the height adjuster extending through the tool beam support, installing a retaining fastener on the distal end of the height adjuster to retaining the cover attachment plate to the height adjuster, installing an adjustment nut onto a proximal end of the height adjuster, and adjusting the adjustment nut to abut a top side of the tool beam support.

In another embodiment of the method, the method includes configuring the tool beam support to permit the height adjuster move along the tool beam support for a predefined distance.

In another embodiment of the method, the step of providing a tool alignment device includes selecting a height adjuster that is a threaded rod.

In another embodiment of the method, the step of providing a tool alignment device includes selecting a tool alignment plate where at least one of the plate openings is an elongated slot.

In another embodiment of the method, the step of providing the alignment tool includes selecting the alignment tool having a set-screw flange extending transversely from a first planar surface of the plate body and defining a threaded opening for threadably receiving a set screw therethrough. The step of attaching the tool alignment plate to the manway body/flange includes installing a fastener through at least one of the plurality of plate openings and into a corresponding opening in the manway body/flange. The step of attaching the tool alignment plate to the manway body/flange also includes advancing the set screw through the threaded opening through the set-screw flange to engage the set screw with a circumferential edge of the manway body/flange, thereby forcing the at least one fastener against an inside surface of the corresponding opening in the manway body/flange.

In another embodiment of the method, the step of attaching the cover attachment plate to the manway cover includes installing a fastener through each of the at least one cover plate opening and into a corresponding opening in the manway cover.

BRIEF DESCRIPTION OF THE DRAWINGS

FIG. 4 is a side elevational view of an alignment tool of present invention showing the alignment tool plate connected to an outside surface of a manway body/flange.

FIG. 5 is a side elevational view of an alignment tool of the present invention showing the alignment tool plate connected to an inside surface of a manway body/flange.

DETAILED DESCRIPTION OF THE PREFERRED EMBODIMENT

Figure 1:
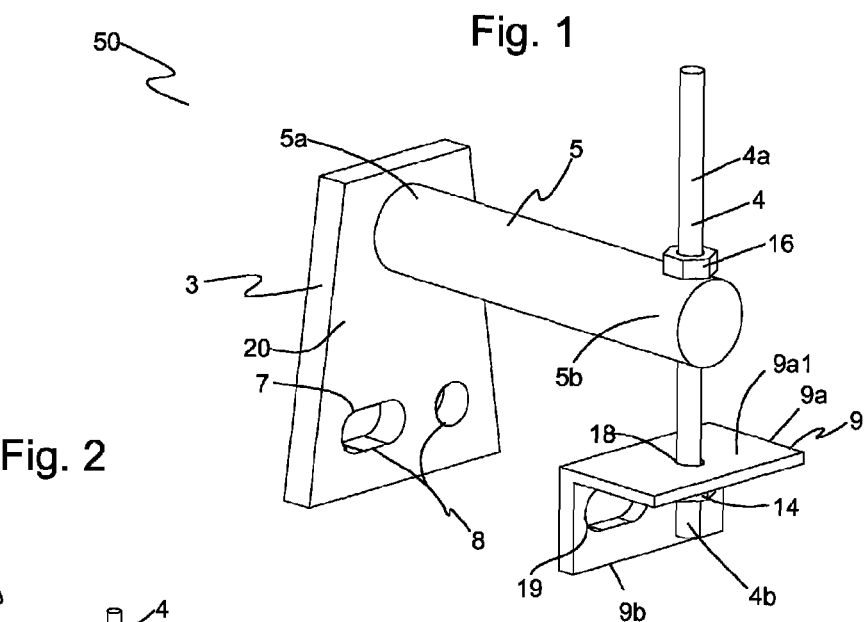
FIG. 1 is a front perspective view of one embodiment of an alignment tool of the present invention.

The preferred embodiment(s) of the present invention is illustrated in FIGS. 1-8. FIG. 1 illustrates a front perspective view of one embodiment of an alignment tool 50 of the present invention. Alignment tool 50 includes an alignment tool plate 3, a tool beam support 5, a cover attachment plate 9, and a height adjuster 4. Alignment tool plate 3 has the tool beam support 5 extending a predefined distance transversely from alignment tool plate 3. In one embodiment, tool beam support 5 is a solid cylindrical bar made of steel or other rigid materials that is attached to a plate body 20 by welding or threaded engagement at a proximal end portion 5a. Other shapes of tool beam support 5 are acceptable, such as a tube (round, square, etc.), an angle bar, a plate, an I-beam, and the like.

A plurality of plate openings 8 extend through alignment tool plate 3. In one embodiment, at least one of plate openings 8 is an elongated slot to facilitate alignment of plate openings 8 with openings in a manway body/flange 2 (shown in FIG. 2). Alignment tool plate 3 may have more or fewer plate openings 8 depending on the size and configuration of the manway body/flange 2.

Height adjuster 4 extends through an opening 56 (shown in FIG. 4) that extends transversely through distal end portion 5b of tool beam support 5. Height adjuster 4 also extends through cover attachment plate 9 spaced from distal end portion 5b. In one embodiment, height adjuster 4 is a threaded rod and opening 56 is a smooth bore. In another embodiment, opening 56 is also threaded for threaded engagement with threaded height adjuster 4.

In one embodiment, an adjustment nut 16 installed on proximal end 4a of height adjuster 4 (e.g., threaded rod) is used to advance height adjuster 4 in order to change the vertical position of cover attachment plate 9. For example, with adjustment nut 16 abutting distal end 5b of tool beam support, the user rotates adjustment nut 16 to raise or lower height adjuster 4. In other embodiments, height adjuster 4 is a threaded rod threadably engaged in opening 56 (also threaded; shown in FIG. 4) through tool beam support 5. A wheel, handle, pin extending through height adjuster 4, T-handle, tool (e.g., wrench), or other structure attached to or engaging height adjuster 4 is used to advance height adjuster 4 through tool beam support 5 by rotating threaded height adjuster 4 in threaded opening 56.

In one embodiment, cover attachment plate 9 has an L-shape with a first cover plate portion 9a and second cover plate portion 9b. First cover plate portion 9a extends transversely or substantially perpendicularly to a second cover plate portion 9b while a planar surface 9a1 of first cover plate portion is substantially parallel to tool beam support 5. First cover plate portion 9a has a first portion opening 18 to receive height adjuster 4. In one embodiment, first portion opening 18 is threaded to releasably engage height adjuster 4 that is a threaded rod. In such an embodiment, a retaining fastener 14 such as a nut is optional. In another embodiment, height adjuster 4 is received in first portion opening 18 and fixed in place by welding to first cover plate portion 9a and/or second cover plate portion 9b. Second cover plate portion 9b has at least one second portion opening 19 that is/are sized and spaced to align with openings in manway cover 1.

Retaining fastener 14 on a distal end 4b of height adjuster 4 maintains cover attachment plate 9 attached to height adjuster 4. Retaining fastener 14 may be a threaded nut, a pin, a plate, or other structure that attaches to or extends through distal end 4b of height adjuster 4 to prevent height adjuster 4 from separating from or disengaging with cover attachment plate 9. In another embodiment, distal end 4b of height adjuster 4 is secured to cover attachment plate 9 by threaded engagement, welding, or other means.

In another embodiment, cover attachment plate 9 is a flat plate (e.g., without first cover plate portion 9a) to which height adjuster 4 is attached by welding, fasteners, clamps, threaded engagement, or other means. For example, height adjuster 4 extends along and is welded to one face of cover attachment plate 9 between a pair of second portion openings 19. In another example, retaining fastener 14 is welded to a top edge or other portion of cover attachment plate 9 and is positioned to threadably receive height adjuster 4.

Figure 2:
FIG. 2 is a rear perspective view of the alignment tool of FIG. 1 shown installed on a manway frame/flange and on a manway cover.

FIG. 2 is a rear perspective view of alignment tool 50 of FIG. 1 shown with alignment tool plate 3 attached to manway body/flange 2 using fasteners 11 extending through plate openings 8 (not visible) and into manway body/flange 2. Cover attachment plate 9 is similarly attached to a manway cover 1. Preferably, fasteners 11 are threaded bolts that extend through openings in manway body/flange 2 and manway cover 1 to engage corresponding threaded openings or extend through corresponding through-openings in manway body/flange 2 and manway cover 1, respectively.

Figure 3:
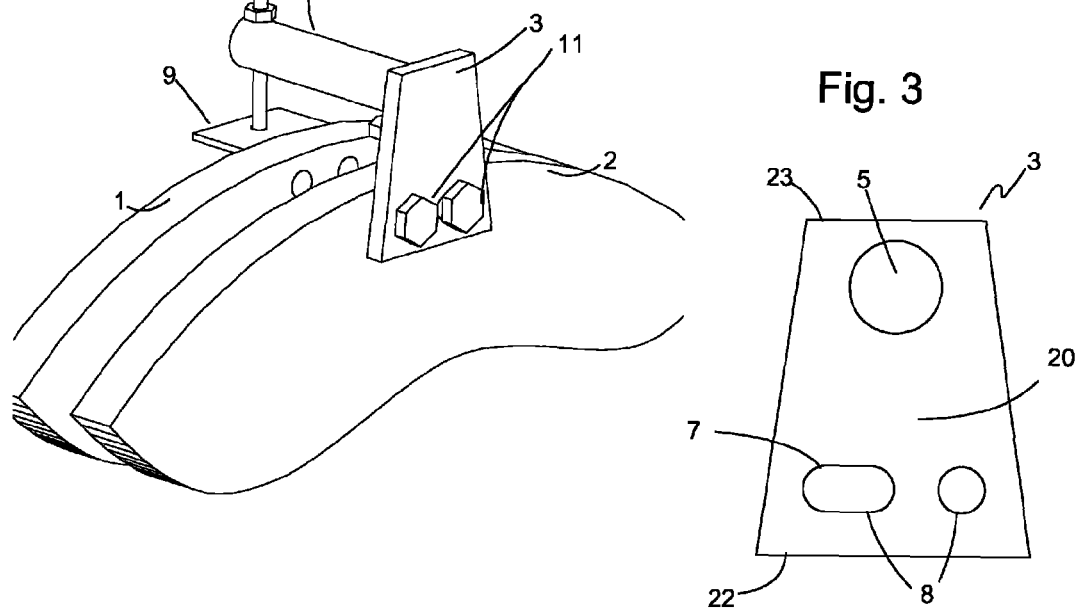
FIG. 3 is a front elevational view of one embodiment of an alignment tool plate of the present invention.

FIG. 3 is a front elevational view of one embodiment of alignment tool plate 3 with tool beam support 5. Tool plate 3 has a plate body 20 with a lower or first edge 22 and an upper or second edge 23. In one embodiment, plate body 20 is a steel plate with a trapezoidal shape for ease and economy of manufacture. Plate openings 8 are positioned adjacent first edge 22 and tool beam support 5 is positioned near second edge 23. Other shapes of plate body 20 are acceptable, such as rectangular, arcuate, or other shapes. In some embodiments, first edge 22 is arcuate to generally match the rounded shape of some manway body/flanges 2. Plate openings 8 extend through plate body 20. Preferably, one of plate openings 8 is an elongated slot 7. Plate openings 8 are used to fasten alignment tool plate 3 to manway body/flange 2 as shown in FIG. 2.

FIG. 4 is a side view showing alignment tool 50 of the present invention attached to a manway body/flange 2 and to manway cover 1. As illustrated, fasteners 11 (e.g., bolts) fasten tool plate 3 to an outside surface 26 of manway body/flange 2 with the tool beam support 5 extending over and across manway body/flange 2 and manway cover 1. Tool beam support 5 is positioned on alignment tool plate 3 to be a predefined vertical distance D1 from a circumferential perimeter 28 of manway body/flange 2. Fasteners 11b also secure cover attachment plate 9 to an outside surface 30 of manway cover 1. In the example shown in FIG. 4, cover attachment plate 9 is preferably a steel plate with an L-shape as discussed above. Height adjuster 4 extends transversely through distal end 5b of tool beam support 5 at a predefined distance D2 from tool plate 3 and through a support portion 9a of cover attachment plate 9. As a result, manway cover 1 is spaced from manway body/flange 2 by a predefined distance D3. Distance D3 is sufficient to allow alignment and insertion of the manway cover bolts through the manway cover and into and through the manway body/flange where the inserted cover bolts support the manway cover permitting the removal of cover alignment plate 9 from the manway cover. A retaining fastener 14 secures cover attachment plate 9 to height adjuster 4.

FIG. 5 is a side view of another embodiment of alignment tool device 50 of the present invention shown attached to manway body/flange 2 and cover 1. In the example of FIG. 5, tool plate 3 is secured to an inside surface 32 of manway body/flange 2 using fasteners 11. Tool beam support 5 extends from alignment tool plate 3 in a fashion similar to the embodiment shown in FIG. 4. In some embodiments where alignment tool plate 3 is attached to inside surface 32, tool beam support 5 has a reduced length to maintain a chosen value for predefined distance D3 between manway body/flange 2 and manway cover 1.

It is contemplated that tool beam support 5 may include a slot 5a for receiving height adjuster 4 (shown in FIG. 6A), which slot 5a permits movement of height adjuster 4 along tool beam support 5. It is also contemplated that tool beam support 5 may be tubular for supporting one or more rollers on an inside or outside track (shown in FIGS. 6B and 6C) with height adjuster 4 extending through a tubular roller shaft transversely connected to the one or more rollers 6. The tubular roller shaft includes a height-adjusting surface for making contact with an adjusting nut 6 to raise or lower height adjuster 4 and therefore manway cover 1. The rollers provide horizontal/lateral movement of height adjuster 4 and attached cover 1 along the longitudinal direction of tool beam support 5 for moving manway cover 1 toward or away from manway body/flange 2. In another embodiment, tool beam support 5 is an I-beam and supports a beam trolley/hoist as is known in the art. Beam trolley/hoist 100 is then used to raise or lower cover attachment plate 9 using height adjuster 4, where height adjuster is a rod, chain, hook, or the like.

Figure 6:
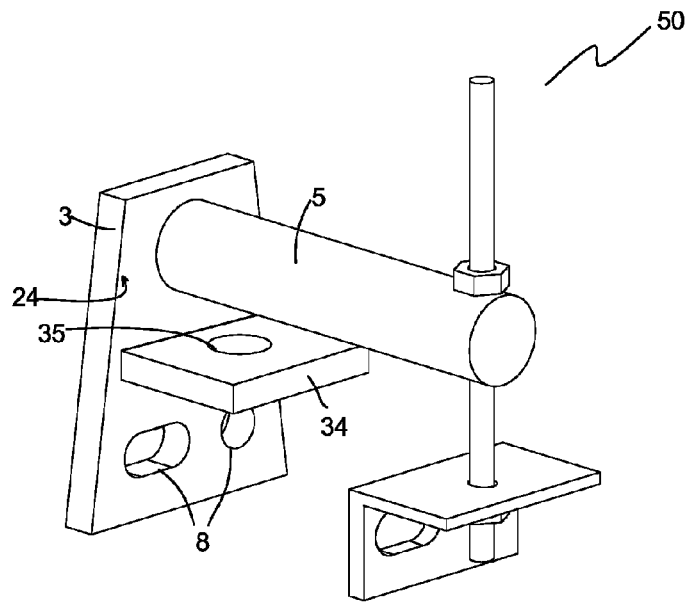
FIG. 6 is a front perspective view of another embodiment of the alignment tool of the present invention that includes a set-screw flange extending from the alignment tool plate.
Figure 6A:
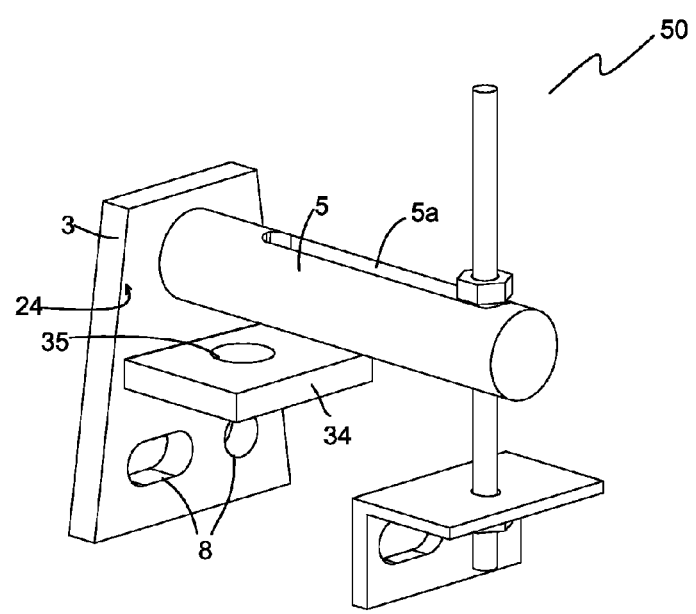
FIG. 6A is a front perspective view of another embodiment of the alignment tool showing a tool beam support with a slot for receiving the height adjuster.
Figure 6B:
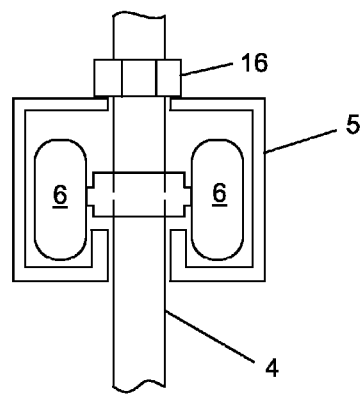
FIG. 6B is a cross-sectional view of another embodiment of the tool beam support of the present invention showing a tubular structure with a slot and rollers for movably supporting the height adjuster.
Figure 6C:
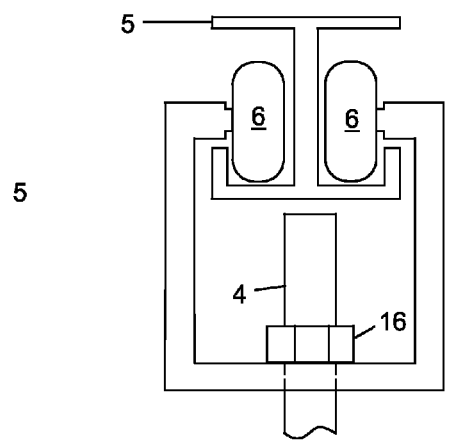
FIG. 6C is a cross-sectional view of another embodiment of the tool beam support showing an I-beam structure with rollers for movably supporting the height adjuster.

FIG. 6 is a front perspective view of another embodiment of alignment tool 50 for securing alignment tool plate 3 to manway body/flange 2. In this embodiment, a set-screw flange 34 extends transversely from first planar surface 24 of alignment tool plate 3. Set-screw flange 34 is positioned between tool beam support 5 and plate openings 8. Set-screw flange 34 has one or more set-screw opening 35 (preferably threaded) that extends transversely therethrough. In one embodiment, set-screw flange 34 is a steel plate or L-shaped angle bracket attached to first planar surface 24 by (1) welding, (2) bolts extending through alignment tool plate 3 and into set-screw flange 34, or (3) other means. In another embodiment, set-screw flange 34 has a plurality of set screw openings 35 each of which is aligned with plate openings 8.

Figure 7:
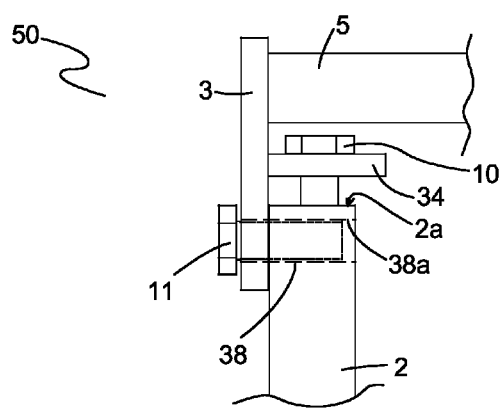
FIG. 7 is a side elevational view of the embodiment of FIG. 6 shown with a set screw for securing the alignment tool plate to the manway body/flange

Referring now to FIG. 7, a side view shows a portion of alignment tool 50 with set-screw flange 34 and alignment tool plate 3 attached to manway body/flange 2. Set-screw flange 34 has a set-screw 10 threadably connected through set-screw opening 35. Set-screw 10 extends through set-screw flange 34 to contact a circumferential peripheral edge 2a of manway body/flange 2. A fastener 11 extends through tool plate 3 and into a manway body/flange opening 38. Upon turning set-screw 10 against peripheral edge 2a of manway body/flange 2, fastener 11 is forced against an inside surface 38a of manway body/flange opening 38 and "jams" fastener 11 against inside surface 38a of manway body/flange opening 28 to effectively secure alignment tool plate 3 to manway body/flange 2.

Figure 8:
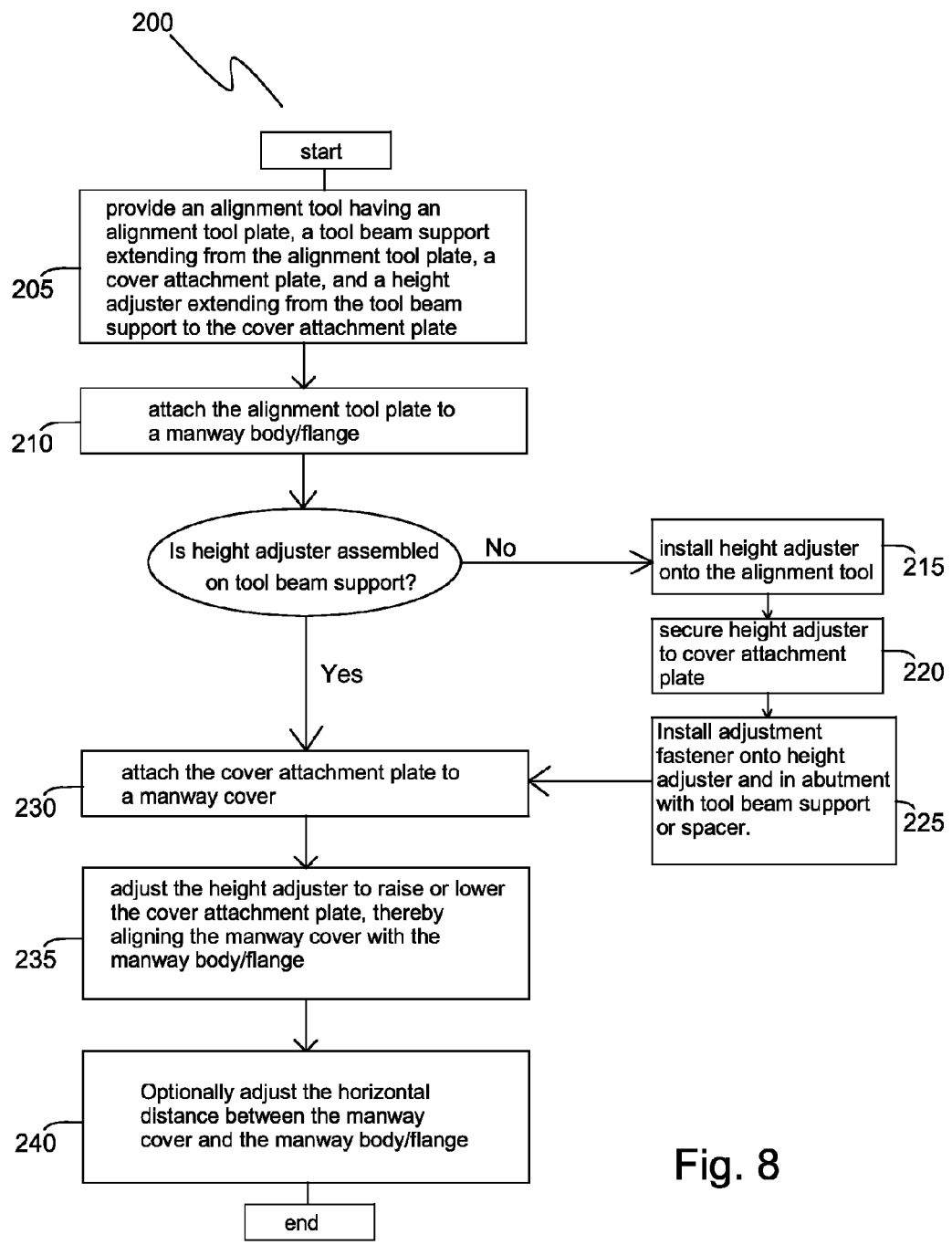
FIG. 8 is a flow chart illustrating steps in one embodiment of a method of aligning a manway cover with a manway body/flange of the present invention.

Referring now to FIG. 8, a flow chart illustrates steps in one method 200 of aligning a manway cover 1 with a manway body/flange. In step 205, the user provides an embodiment of alignment tool 50 that includes alignment tool plate 3, tool beam support 5, height adjuster 4, and cover attachment plate 9. In step 210, alignment tool plate 3 is secured to manway body/flange 2. Fasteners 11 are positioned through plate openings 8 and into or through corresponding openings in manway body/flange. When alignment tool 50 is equipped with a set-screw flange 34, set screw 10 is optionally advanced against top circumferential edge 2a of manway body/flange 2 to jam fastener(s) 11 against inside edge 38a of opening 38 in manway body/flange 2. Using set screw 10 is especially effective when opening 38 is a smooth bore.

In optional step 215, height adjuster 4 is installed onto alignment tool 50. In one embodiment, height adjuster 4 is a threaded rod that is inserted or threaded into and through distal end 5b of tool beam support 5 and into or through first portion opening 18 in cover attachment plate 9. In optional step 220, a retaining fastener 14 is installed on distal end 4b of height adjuster 4 to secure height adjuster 4 to cover attachment plate 9. In optional step 225, an adjustment nut 16 is threaded onto the threaded rod of height adjuster 4 until adjustment nut 6 contacts tool beam support 5 or a spacer (not shown) that is in intimate contact with tool beam support 5.

In some embodiments, the step of providing an adjustment tool 50 includes providing height adjuster 4 assembled on or to tool beam support 5. In such embodiments, some or all of steps 215-225 are not performed.

In step 230, cover attachment plate 9 is attached to manway cover 1. Preferably, fasteners 11 are positioned through cover plate openings 19 and into or through corresponding openings in manway cover 1.

In step 235, if needed, the height of the manway cover is adjusted to align openings in manway cover 1 with corresponding openings 38 in manway body/flange 2. In one embodiment, to raise or lower cover 1, adjustment nut 6 is rotated clockwise or counterclockwise, whatever is required, to align the openings in manway cover 1 with the corresponding openings in manway body/flange 2. In other embodiments, a handle or other attachment to height adjuster 4 is used to threadably advance height adjuster 4 up or down through opening 56 in tool beam support 5.

In optional step 240, the horizontal distance between manway cover 1 and manway body/flange is adjusted by moving height adjuster 4 along tool beam support 5.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of aligning a manway cover to a manway body/flange comprising:
   providing an alignment tool comprising:
      a body/flange alignment tool plate having a plurality of plate openings each spaced from a first edge of a plate body and a tool beam support extending transversely from the body/flange alignment tool plate;
      a cover attachment plate having at least one cover plate opening sized and positioned to align with a corresponding manway cover opening in the manway cover;
      a threaded height adjuster extending between and connecting the tool beam support to the cover attachment plate, wherein the cover attachment plate is vertically translated using the threaded height adjuster;
   attaching the body/flange alignment tool plate to the manway body/flange;
   attaching the cover attachment plate to the manway cover; and
   adjusting the vertical position of the threaded height adjuster to raise or lower the cover attachment plate, thereby vertically translating the manway cover and causing alignment of the openings in the manway cover with the openings in the manway body/flange.

2. The method of claim 1, further comprising:
   inserting the threaded height adjuster through a distal end portion of the beam support with a distal end of the threaded height adjuster extending through an opening through the cover attachment plate and with a proximal end of the threaded height adjuster extending through the tool beam support;

installing a retaining fastener on the distal end of the threaded height adjuster, thereby retaining the cover attachment plate to the threaded height adjuster;

installing an adjustment nut onto a proximal end of the threaded height adjuster; and adjusting the adjustment nut to abut a top side of the tool beam support.

3. The method of claim 1, wherein the step of providing the alignment tool includes selecting the threaded height adjuster that is a threaded rod.

4. The method of claim 1, wherein the step of providing the alignment tool includes selecting the body/flange alignment tool plate wherein at least one of the plurality of plate openings is an elongated slot.

5. The method of claim 1, wherein
the step of providing the alignment tool includes selecting the alignment tool with the body/flange alignment tool plate having a set-screw flange extending transversely from a first planar surface of the plate body and defining a threaded opening for threadably receiving a set screw therethrough;

wherein the step of attaching the body/flange alignment tool plate to the manway body/flange includes installing a fastener through at least one of the plurality of plate openings and into a corresponding opening in the manway body/flange; and wherein the step of attaching the body/flange alignment tool plate to the manway body/flange includes advancing the set screw through the threaded opening through the set-screw flange to engage the set screw with a circumferential edge of the manway body/flange, thereby forcing the at least one fastener against an inside surface of the corresponding opening in the manway body/flange.

6. The method of claim 1, wherein the step of attaching the cover attachment plate to the manway cover includes installing a fastener through each of the at least one cover plate opening and into a corresponding opening in the manway cover.

* * * * *